US007855675B2

(12) United States Patent
Fouet

(10) Patent No.: US 7,855,675 B2
(45) Date of Patent: Dec. 21, 2010

(54) METHOD AND DEVICE FOR DETECTING AN ENVIRONNING AIRCRAFT

(75) Inventor: Guillaume Fouet, Toulouse (FR)

(73) Assignee: Airbus France, Toulouse (FR)

( * ) Notice: Subject to any disclaimer, the term of this patent is extended or adjusted under 35 U.S.C. 154(b) by 19 days.

(21) Appl. No.: 12/390,939

(22) Filed: Feb. 23, 2009

(65) Prior Publication Data

US 2009/0212992 A1 Aug. 27, 2009

(30) Foreign Application Priority Data

Feb. 25, 2008 (FR) .................................. 08 00998

(51) Int. Cl.
*G01S 13/00* (2006.01)

(52) U.S. Cl. .............................. 342/33; 342/36; 342/37

(58) Field of Classification Search .............. 342/36–37
See application file for complete search history.

(56) References Cited

U.S. PATENT DOCUMENTS

| | | | | |
|---|---|---|---|---|
| 5,877,721 | A * | 3/1999 | Tsang et al. | 342/36 |
| 6,850,185 | B1 * | 2/2005 | Woodell | 342/30 |
| 2002/0042673 | A1 * | 4/2002 | Ooga | 701/120 |
| 2003/0067542 | A1 | 4/2003 | Monroe | |
| 2004/0210847 | A1 * | 10/2004 | Berson et al. | 715/788 |
| 2005/0128124 | A1 * | 6/2005 | Greneker et al. | 342/22 |
| 2007/0299597 | A1 | 12/2007 | Fetzmann | |
| 2007/0299598 | A1 | 12/2007 | Fetzmann | |

FOREIGN PATENT DOCUMENTS

| | | |
|---|---|---|
| FR | 2 901 903 | 12/2007 |
| FR | 2 902 221 | 12/2007 |
| WO | 97/43665 | 11/1997 |

OTHER PUBLICATIONS

Preliminary Search Report dated Dec. 11, 2008 w/ English translation.

* cited by examiner

*Primary Examiner*—Thomas H Tarcza
*Assistant Examiner*—Timothy A Brainard
(74) *Attorney, Agent, or Firm*—Dickinson Wright PLLC

(57) ABSTRACT

A radar unit on board an aircraft scans a scan area of surrounding space relative to a runway to detect any nearby aircraft and a unit presents to a pilot an indication of such detection of the presence of at least one nearby aircraft. The technique involves determining: a heading of the aircraft, positions of thresholds of the runway, an orientation of the runway, a maximum relative bearing, a minimum relative bearing, a maximum elevation, a minimum elevation, a slant range for scanning the scan area from the heading, thresholds and orientation, predetermined vertical and horizontal angles of an approach center line of the runway, a predetermined length of edges of the scan area, and the scan commands enabling the radar to scan said scan area using the maximum relative bearing, the minimum relative bearing, the maximum elevation, the minimum elevation and the slant range. The radar unit is an air-air mode radar configured to detect a nearby aircraft that is in flight; and the scan area has at least one vertical area of space which is situated to one side of the runway and defined relative to a center line of the runway.

9 Claims, 5 Drawing Sheets

METHOD AND DEVICE FOR DETECTING AN ENVIRONNING AIRCRAFT

TECHNICAL FIELD OF THE INVENTION

The present invention relates to a method and a device for detecting nearby aircraft, preferably for an aircraft, in particular a transport airplane, taxiing on the ground on an airport.

The particular aim of the present invention is to provide a safeguard against runway incursions, which are the cause of numerous accidents between aircraft. It is known that runway incursions occur when an aircraft crosses an airport runway on which another aircraft is in the process of taking off, landing or simply taxiing. An aircraft can cross a runway for numerous reasons: ignorance of the proximity of the runway, the illusion of having received authorization from a controller, an erroneous authorization given by a controller, etc.

BACKGROUND OF THE INVENTION

To avoid such collisions between aircraft on an airport, onboard display systems are known that display a map of the airport, to which symbols are added representing the position of nearby aircraft. However, the positions of these nearby aircraft are, generally, transmitted to said display systems, either by the nearby aircraft themselves or by airport control stations. Hence, such an onboard display system has the drawback that the nearby aircraft and/or the airport control stations must be equipped with cooperating means, which must also all be activated, to enable the detection of all the nearby aircraft. This usual display system is therefore not independent and has limited use.

Documents FR-2 902 221 and FR-2 901 903 disclose systems, notably display systems, that provide an aid to navigation on the ground for an aircraft on an airport.

SUMMARY OF THE INVENTION

The present invention relates to a method of detecting nearby aircraft, which is intended to be implemented by an aircraft taxiing on the ground on an airport (or flying close to the airport, notably when taking off or landing), and which overcomes the abovementioned drawbacks.

To this end, according to the invention, said method is noteworthy in that:

A/ a detection mode is activated that is implemented by at least one radar:
- which is on board the aircraft;
- which is capable of performing a scan of the surrounding space; and
- which can detect, in said detection mode, a moving nearby aircraft; and B/ when a detection mode of the radar is activated, the following operations are performed automatically:
- a) a scan area is determined which depends on a runway of the airport;
- b) scan commands for the radar are determined that make it possible to have said radar scan said scan area;
- c) these scan commands are transmitted to said radar so that it performs a scan of all of said scan area, and does so in said detection mode; and
- d) if said radar detects, in this scan, the presence of at least one nearby aircraft, a corresponding indication is presented to a pilot of the aircraft.

Thus, an aircraft that implements the detection method according to the invention is able to detect the presence of any nearby aircraft that is located in a particular area (said scan area) which is defined close to a runway of the aircraft, then to inform the pilot thereof. The method according to the invention therefore makes it possible to improve perception by the pilot of the situation surrounding his aircraft. Said method also makes the surveillance of a runway (and of its approach area in particular) much safer and more robust, as specified hereinbelow.

The present invention also makes it possible to reduce the workload of the pilot, by improving his understanding of the surrounding traffic. In particular, the pilot of the aircraft on which the method to the invention is imlplemented may be informed of any aircraft that is in the process of taking off or landing on an airport runway that he is about to cross, which makes it possible to prevent collisions due to runway incursions such as those mentioned above.

Furthermore, the implementation of the method according to the invention is completely independent and requires no means external to the aircraft. Consequently, detection according to the present invention can be implemented on any type of airport, without requiring the help of air traffic control or of ground control, and makes it possible to detect any type of nearby aircraft, without requiring cooperation on its part.

In a particular embodiment, the activation of said detection mode of the radar is performed manually by a pilot of the aircraft.

Furthermore, in a preferred embodiment, in the step A/, the following operations are performed automatically:

α) characteristics of at least one runway of the airport are received, making it possible to determine a characteristic position of this runway;

β) the current position of the aircraft, which is taxiing, for example, on the airport, is determined;

γ) this current position is compared to said characteristic position; and

δ) if said comparison reveals that the aircraft is located close to said runway, said detection mode is activated.

In this preferred embodiment, the detection method according to the invention is completely automatic, and it is therefore activated automatically immediately when the aircraft approaches a runway (or any other traffic lane) of the airport. This preferred embodiment is thus particularly robust and makes it possible to reduce the workload of the pilot who does not have to initiate the detection on approaching a runway.

Moreover, in a preferred embodiment:
- said radar is an air-air mode radar which is capable of detecting a nearby aircraft that is in flight; and
- said scan area comprises two vertical areas of space that are situated either side of the runway, and the positionings of which are defined relative to the center line of the runway.

In this case, advantageously:
- the heading of the aircraft, the positions of the thresholds of the runway and the orientation of the runway are determined;
- from the preceding information, and from predetermined vertical and horizontal angles of an approach center line of the runway and from a predetermined length of the edges of the area to be scanned, the maximum relative bearing, the minimum relative bearing, the maximum elevation, the minimum elevation and the oblique distance of scan area are determined; and
- the latter information is used to determine the scan commands enabling the radar to scan said scan area.

This preferred embodiment is intended more particularly, although not exclusively, for the surveillance of aircraft that are approaching, in the landing phase or in the take-off phase, and which are using a runway that the aircraft (the aircraft implementing the method according to the invention) is in the process of crossing. This preferred embodiment is therefore particularly appropriate for preventing the occurrence of a runway incursion, that is, a crossing of, or an unauthorized taxiing on, a landing runway of an airport.

Furthermore, in another particular embodiment:

- said radar is a radar provided with a Doppler processing function which is capable of detecting nearby aircraft taxiing on the ground and of determining the speed of the latter relative to the aircraft implementing said inventive method; and
- said scan area comprises a horizontal area which encompasses at least the surface of said runway.

This particular embodiment can in particular be employed when the aircraft implementing said method moves onto a runway, takes off or lands, in order to enable it to detect any nearby aircraft that is moving on the ground or close to the runway being used.

This particular embodiment can, obviously, be used in a variant of the abovementioned preferred embodiment using an air-air radar. However, in a particular embodiment of the present invention, it is possible to use:

- either the abovementioned two different radars simultaneously during surveillance, namely said air-air radar for monitoring the aircraft in flight and said radar equipped with a Doppler processing function for monitoring the aircraft taxiing on the ground;
- or a single radar that is provided with both an air-air mode and a Doppler processing capability.

This makes it possible to obtain complete surveillance (on the ground and in flight) of the environment of the aircraft (the aircraft implementing the present invention).

Furthermore, advantageously, in the step B/d) of the method, if a nearby aircraft is detected:

- an audible and/or visual warning is emitted; and/or
- a characteristic symbol which illustrates the current position of the nearby aircraft, together with, preferably, an auxiliary symbol which indicates its current altitude, are presented on an airport map which is displayed on at least one display screen.

Moreover, advantageously:

- for each nearby aircraft detected, a danger level is determined; and
- in the step B/d), for each detected nearby aircraft, an indication highlighting the corresponding danger level, for example using a set of different colors, is presented.

Thus, according to the dangerousness of the situation, the pilot will be informed differently. As an illustration, an aircraft that is moving away is generally considered to be less dangerous than an aircraft that is approaching.

The present invention also relates to a device which is on board an aircraft (situated on or close to an airport) and which makes it possible to detect nearby aircraft.

According to the invention, said device is noteworthy in that it comprises:

- at least one radar which is capable of performing a scan of space and which is able to detect, in a detection mode, a moving nearby aircraft;
- activation means which are capable of activating a detection mode that has to be implemented by said radar;
- means for determining a scan area which depends on a runway of the airport;
- means for determining scan commands for the radar, which make it possible to have said radar scan said scan area, said scan commands being transmitted to said radar in order for it to perform a scan of all of said scan area in said detection mode; and
- means for presenting, as appropriate, an indication to a pilot of the aircraft, indicating detection by the radar of at least one nearby aircraft.

The device according to the invention is completely independent and makes it possible to detect all the aircraft located (on the ground or in flight), in particular close to a runway of the airport, in particular a runway that the aircraft equipped with said device is planning to cross.

BRIEF DESCRIPTION OF THE DRAWINGS

The figures of the appended drawing will clearly show how the invention can be implemented. In these figures, identical references designate similar elements.

DETAILED DESCRIPTION OF THE INVENTION

Figure 1:
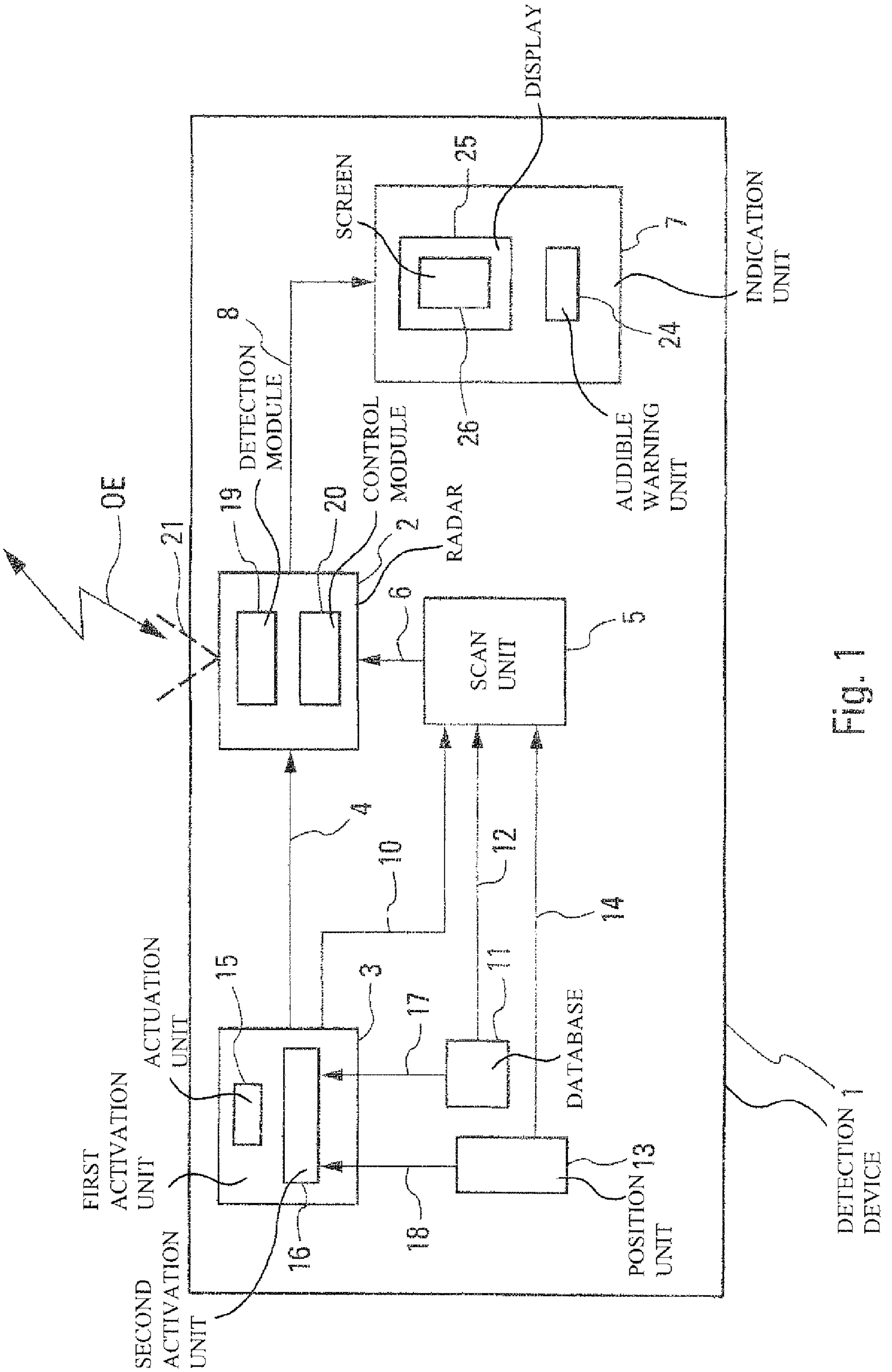
FIG. 1 is a block diagram of a detection device according to the invention.

The device 1 according to the invention and diagrammatically represented in FIG. 1 is designed to be fitted on an aircraft A, in particular a civilian or military transport aircraft, that is located on or close to an airport, and it is constructed in such a way as to be able to detect nearby aircraft that are situated in the environment of the aircraft A.

Figure 2:
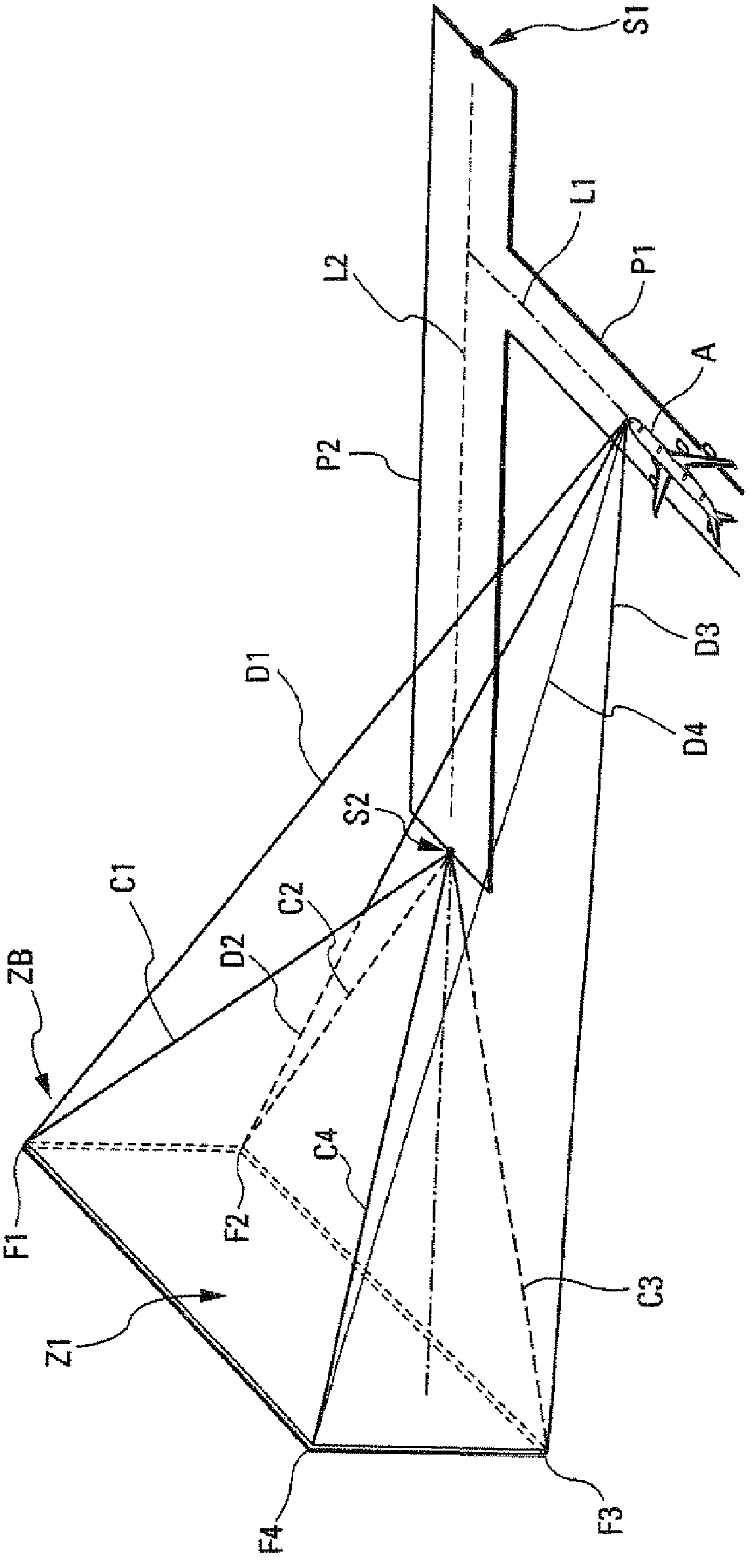
FIG. 2 diagrammatically illustrates a scan area that is defined relative to a runway that an aircraft (equipped with the device according to the invention and taxiing on the ground) is about to reach.

Said aircraft A which is fitted with the device 1 can either be taxiing on the ground on a runway (or on any lane) P1 of the airport, as represented in FIG. 2, or be flying close to or above the airport, in particular when taking off or landing, for example on the runway P2 of FIG. 2.

According to the invention, said detection device 1 comprises:

- at least one radar 2:
  - that is capable of performing a scan of space;
  - that is capable of being activated in such a way as to implement a detection mode, as illustrated by a double arrow representing an electromagnetic wave OE capable of being emitted, then picked up after its reflection at a moving target; and
  - that is able to detect, in such a detection mode, a nearby aircraft that is moving;
- activation means 3 that are linked via a link 4 to said radar 2 and that are capable of activating, that is initiating, said detection mode of the radar 2;
- means 5 that are capable of determining a scan area ZB, specified hereinbelow, which depends on a runway of the airport, and on scan commands making it possible to have said radar 2 scan said scan area ZB. These scan commands are then transmitted by said means 5 to said radar 2 via a link 6 so that the latter will perform a scan of all of said scan area ZB, being in said detection mode during this scan; and
- means 7 that are linked via a link 8 to said radar 2 and that are constructed in such a way as to present to a pilot of the aircraft, if the radar 2 detects at least one nearby aircraft, an indication relating to the presence of that nearby aircraft.

Thus, the device 1 according to the invention is able, on the one hand, to detect the presence of any nearby aircraft that is located in the close environment of the aircraft A (equipped with said device 1), in a particular area (said scan area) which is defined, preferably, in proximity to a runway of the airport, and on the other hand, to inform the pilot of such a detection. The device 1 according to the invention therefore improves perception by the pilot of the situation surrounding his aircraft A. Said device 1 also makes the surveillance of a runway (and of its approach area) much safer and more robust.

Said device 1 also makes it possible to reduce the workload of the pilot, by improving his understanding of the nearby traffic. In particular, the pilot of the aircraft A, on which the device 1 according to the invention is fitted, can be informed of any aircraft that is in the process of taking off or landing on an airport runway P2 that it is about to reach (taxiing, for example, on a runway or lane P1 of center line L1, as represented in FIG. 2). Such a warning makes it possible in particular to prevent collisions due to runway incursions.

Moreover, the device 1 according to the invention is completely independent and requires no means external to the aircraft A. Consequently, detection according to the present invention can be implemented on any type of airport, without requiring the assistance of air traffic control or ground control for example, and makes it possible to detect any type of nearby aircraft, without requiring cooperation on its part.

Said means 5 can be activated by the activation means 3 via a link 10. Furthermore, to determine said scan area ZB, said means 5 use:

- characteristics specified hereinbelow, concerning a landing runway, for example the runway P2 of center line L2 of FIG. 2, characteristics which are, for example, stored in a database 11, in particular a database that is part of a flight management system which, and (FMS) are received via a link 12; and
- at least indications concerning the current position of the aircraft A, which are determined by means 13 and received via a link 14.

These means 13 can correspond to a standard positioning system of an aircraft A, and comprise, for example, a GPS (Global Positioning System) type receiver, radio navigation means, an inertial unit, or a system that employs several of the above elements.

Furthermore, said activation means 3 comprise:

- actuation means 15, for example a button, that are capable of being actuated manually by a pilot of the aircraft A, in order to activate the detection implemented by the device 1 according to the invention; and/or
- means 16 that are capable of automatically activating the detection mode implemented by said device 1.

In a particular embodiment, said means 16 comprise the following automatic elements (integrated and not represented):

- an element for receiving characteristics of at least one runway P2 of the airport, making it possible to determine a characteristic position of this runway. These characteristics can be received from said means 11 via a link 17. Preferably, these characteristics make it possible to determine the positions of the thresholds S1 and S2 of the runway P2 concerned;
- an element for receiving the current position of the aircraft A, preferably said means 13, via a link 18;
- an element for comparing the current position of the aircraft A to that characteristic position. For this, this element calculates, over a horizontal projection, the distance d1 (FIG. 5) from the aircraft A to the center line L2 of the runway P2, and it compares this distance d1 to a given threshold, for example 100 meters; and
- an element that initiates said detection mode via the links 4 and 10, if the preceding comparison reveals that the aircraft A is located close to said runway P2, that is, if the distance d1 from the aircraft A to the center line L2 of the runway P2 is less than said threshold.

In a preferred embodiment:

- said radar 2 is a standard radar equipped with an air-air mode that makes it possible to detect a moving target in flight; and
- said scan area ZB comprises two vertical areas of space Z1 and Z2 that are situated either side of the runway P2. The positionings of these vertical areas Z1 and Z2 are defined relative to the center line L2 of the runway P2. In FIG. 2, only a single vertical area Z1 is represented, namely the area situated to the left of the runway P2 in the view represented in this FIG. 2. Said scan area ZB generally comprises a similar area Z2, situated to the right in FIG. 2.

It is also possible to consider providing only a single vertical area that is located to one side, in particular if, for particular reasons, for example for geographic reasons, no landing and no take-off can be performed on the other side.

This preferred embodiment is intended more particularly, although not exclusively, for the surveillance of the aircraft that are approaching, in the landing phase or in the take-off phase, and that are using a runway P2 that the aircraft A is about to reach or cross. This preferred embodiment is therefore particularly appropriate for preventing the occurrence of a runway incursion, that is, a crossing or an unauthorized taxiing on a landing runway P2 of an airport.

In this preferred embodiment, as detailed more hereinbelow, said means 5 determine, from the heading of the aircraft A, positions of the thresholds S1 and S2 of the runway P2 and the orientation of this runway P2, as well as predetermined vertical and horizontal angles of an approach center line of the runway P2 and predetermined lengths of the edges (F1 F2, F2 F3) of the area Z1 to be scanned, which is for example of rectangular form, the maximum relative bearing, the minimum relative bearing, the maximum elevation, the minimum elevation and the slant range for the scan of said area Z1.

Figure 3:
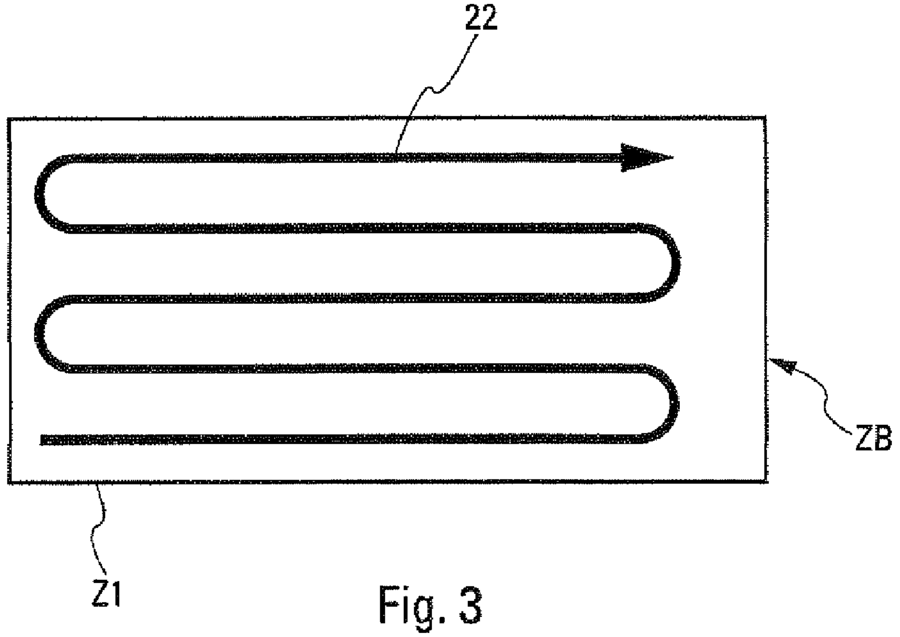
FIG. 3 is a graphic illustrating a possible scan by a radar of a scan area.

Using the latter information, said means 5 then determine the scan commands that enable the radar 2 to scan said scan area ZB, by performing, for example, a scan such as that illustrated in FIG. 3 via an arrow 22.

The vertical area Z1 (represented in FIG. 2) of the scan area ZB is defined relative to the center line L2 of the runway P2, as illustrated by the segments C1, C2, C3 and C4 that link the threshold S2 of the runway P2 to the peaks F1, F2, F3 and F4 of the rectangle forming said vertical area Z1. FIG. 2 also represents segments the D1, D2, D3 and D4 that respectively link the position of the radar 2 to the aircraft A (which is located at its current position) to said peaks F1, F2, F3 and F4 of said vertical area Z1.

Furthermore, in another embodiment that is not represented:

- said radar 2 is a radar provided with a Doppler processing function that is capable of discriminating, in the usual manner, targets moving on the ground by differentiating them through their relative speed of displacement; and
- said scan area ZB comprises a horizontal area that encompasses at least the surface of a runway, for example said runway P2. This horizontal area can relate to any airport area that is to be monitored.

This particular embodiment makes it possible to extend the scope of the use of the device 1. It can in particular be employed in the case of a move onto a runway, a take-off or a landing of the aircraft A, in order to enable it to detect any nearby aircraft that is moving on the ground or close to the runway being used.

This particular embodiment can, of course, correspond to a variant of the abovementioned preferred embodiment using an air-air mode radar. However, in a particular variant embodiment of the present invention, the device 1 comprises:

- simultaneously, the abovementioned two different radars, namely said air-air mode radar for monitoring the aircraft in flight and said radar fitted with a Doppler processing function for monitoring the aircraft taxiing on the ground; or
- a single radar that is provided with both an air-air mode and a Doppler processing capability.

This makes it possible to obtain complete surveillance of the environment (on the ground and in flight) of the aircraft A fitted with the device 1.

Said radar 2, regardless of its embodiment, comprises in particular:

- a detection module 19 that makes it possible to emit electromagnetic waves OE and to receive these electromagnetic waves OE after their reflection at a moving aircraft, and that comprises specific processing means for deducing therefrom, where appropriate, the presence of a moving (nearby) aircraft; and
- a control module 20 that receives scan commands from said means 5 and that comprises standard mechanical means for modifying the orientation of an antenna 21 of the radar 2 in accordance with said scan commands in order to perform a scan of the scan area ZB, as represented by way of example in FIG. 3.

In a particular embodiment, said means 5, or at least some of the calculation elements of said means 5, and in particular the calculation element that determines the scan commands, are directly integrated in said radar 2.

Moreover, said means 7 comprise:

- an audible warning means 24 that emits an audible warning in the cockpit of the aircraft A, if the presence of a nearby aircraft is detected by the radar 2; and/or
- display means 25 that can display, on at least one screen 26, information indicating to a pilot of the aircraft A the presence of nearby aircraft.

Figure 4:
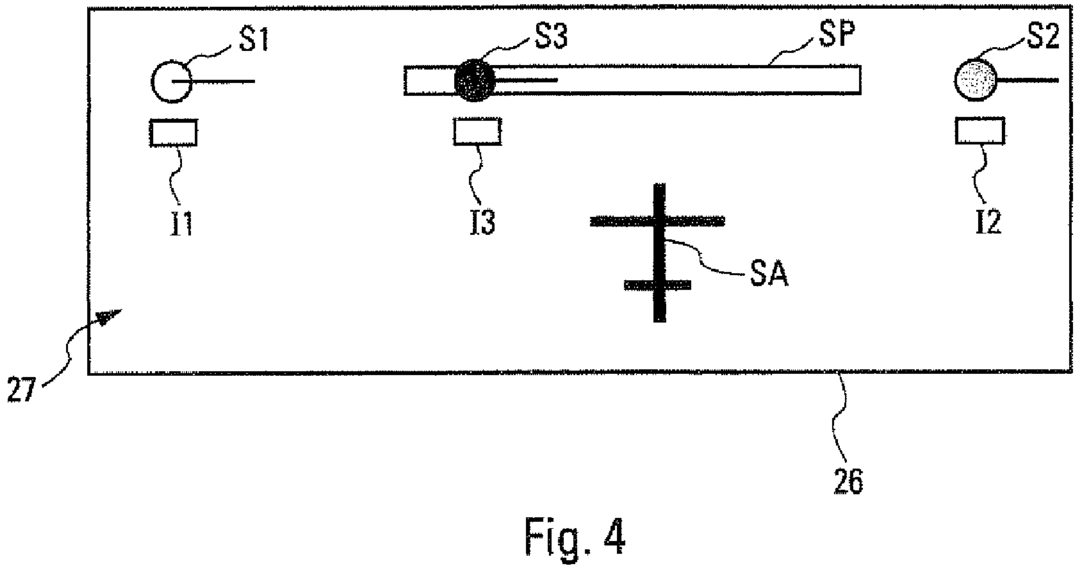
FIG. 4 shows a screen on which different nearby aircraft are represented.

FIG. 4 represents, on an airport map 27 that illustrates at least a part of the airport in plan view:

- a symbol SA that illustrates the current position of the aircraft A on the airport;
- a symbol SP that illustrates the position of a runway, for example the runway P2 of FIG. 2, toward which the aircraft A is directed; and
- symbols S1, S2 and S3 that show the respective positions of nearby aircraft that have been detected by said radar 2.

These symbols S1 to S3 are vertical projections onto the (horizontal) plane of the airport of the current positions of said nearby aircraft. Also, to highlight the fact that certain of these aircraft can currently be in flight, said display means 25 also present, on the screen 26, indication means I1, I2 and I3 that are associated respectively with said symbols S1, S2 and S3 and that indicate the respective current altitudes of said nearby aircraft at the moment they are located in the positions respectively illustrated by said symbols S1, S2 and S3. Thus, the pilot of the aircraft A is in a position to know whether the nearby aircraft detected are located on the ground or in flight, and in the case where they are in flight, at what altitude they are actually located. This enables the pilot to know the actual situation of his environment and accurately estimate the possible dangers.

Furthermore, to refine the information supplied to the pilot:

- said device 1 also comprises means (not represented) for determining a danger level for each nearby aircraft detected; and
- said display means 25 present, for each nearby aircraft detected, an indication highlighting the corresponding danger level, for example using a set of different colors or different shapes for the symbols S1, S2 and S3.

In particular, an aircraft moving away is generally considered to be less dangerous than an aircraft that is approaching. As an illustration, in the example of FIG. 4, the danger level can be highlighted by a set of different colors, in particular:

- a green color for a nearby aircraft having a low danger level, for example an aircraft moving away (in flight), as illustrated by a white circle for the symbol S1;
- an orange color for an aircraft having a medium danger level, for example an aircraft that is approaching (on the ground) the runway, as illustrated by a grey circle for the symbol S2; and
- a red color for an aircraft having a high danger level, for example an aircraft taxiing on the runway, as illustrated by a black circle for the symbol S3.

These different danger levels can also be signaled by the audible warning means 24, which can, for example, broadcast different audible indications according to the danger level, or emit a warning message only if a nearby aircraft is detected that presents a certain danger level (medium or high for example).

Figure 5:
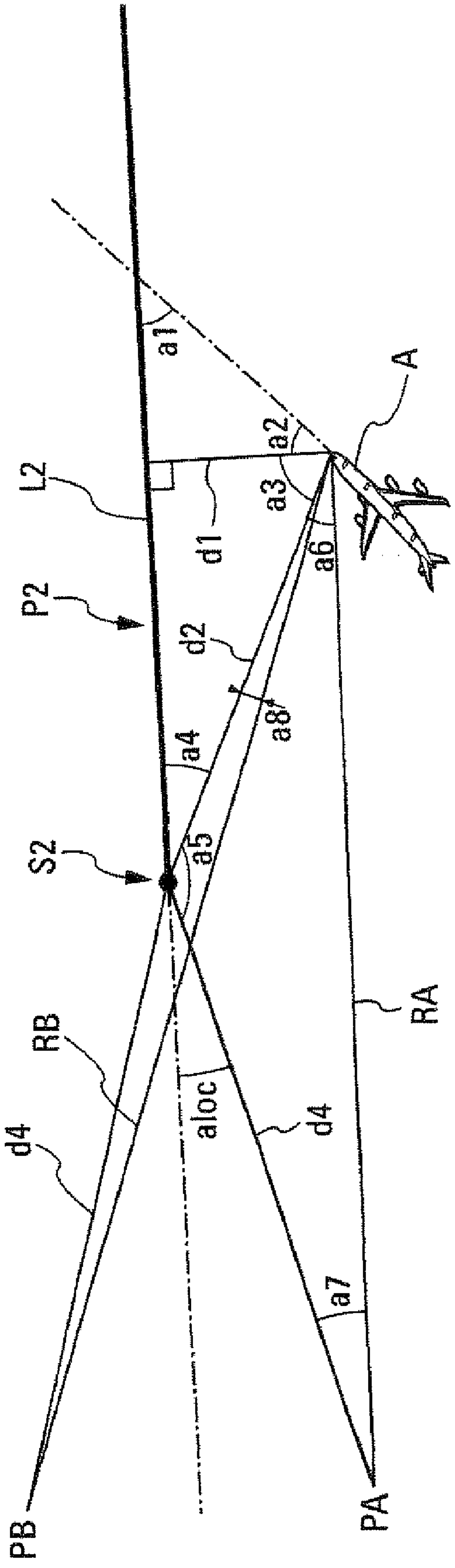
FIGS. 5 and 6 are graphics for explaining calculations implemented by a device according to the invention.
Figure 6:
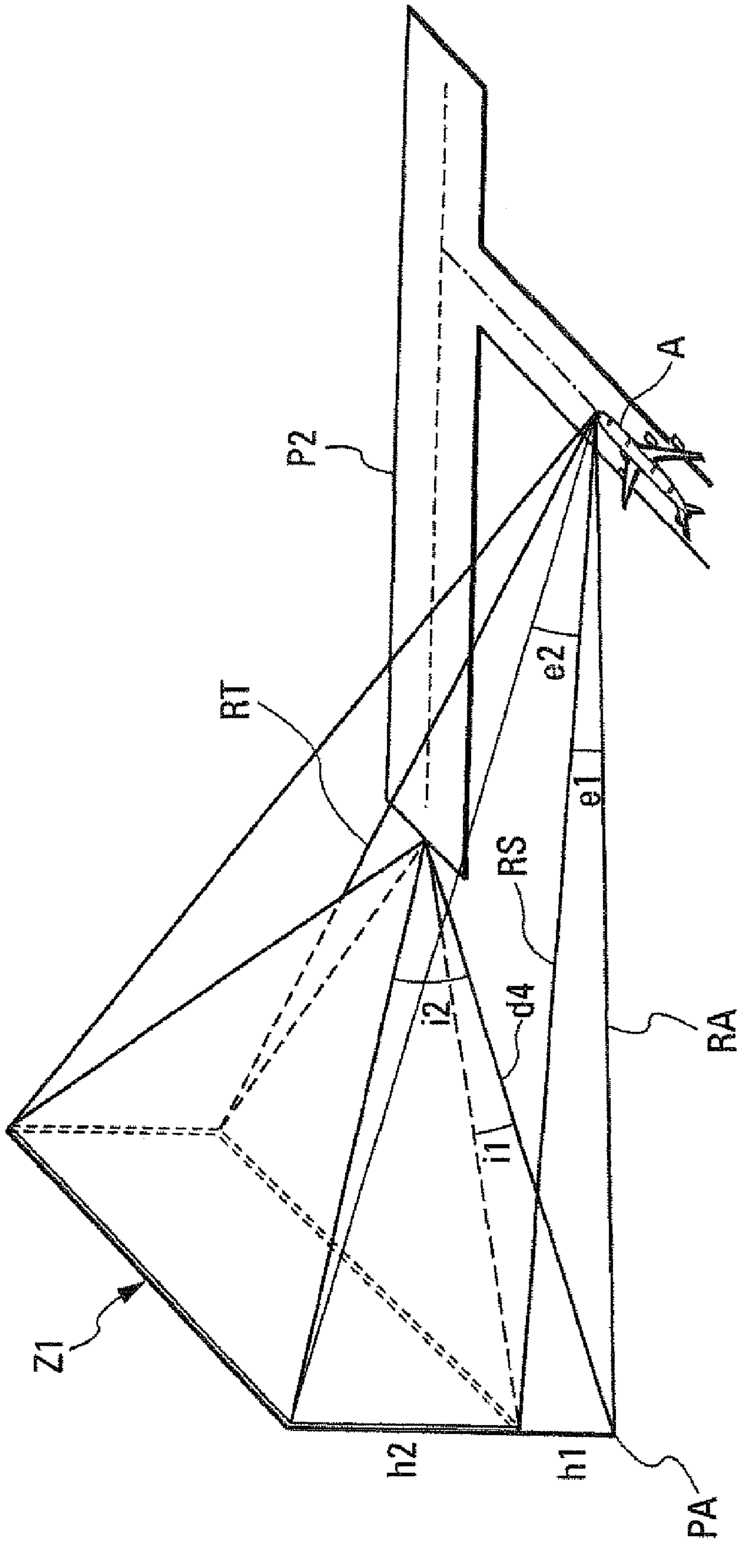

There now follows an explanation, with reference to FIGS. 5 and 6, of the main calculations that can be used to obtain the parameters that are generated by the means 5 and that are required by the radar 2 to perform the required scans.

These parameters are:

- the minimum relative bearing: a2+a3+a6;
- the maximum relative bearing: a2+a3+a8;
- the maximum horizontal detection distance: RA and RB;
- the maximum detection slant range: RS and RT;
- the minimum elevation: h1; and
- the maximum elevation: h1+h2.

All the angles and all the distances above are indicated on the diagrams of FIGS. 5 and 6, as are most of the angles and distances used for their calculation.

To determine the above parameters, said means 5 receive:

- via the means 13, in particular a positioning and attitude system, for example an air data system of the ADIRS (Air Data Inertial Reference System) type, the heading of the aircraft A; and
- via means 11, the positions (geographic coordinates) of the thresholds S1 and S2 of the runway P2 and the orientation of this runway P2 (QFU).

The calculation of the relative bearings and of the horizontal distances RA and RB are explained first.

The horizontal projection of the situation provides:

$$a1=\text{heading}-QFU[360]$$

$$a2=180-90-a1$$

d1 is considered to be the distance from the aircraft A to the runway P2 and d2 the distance between the aircraft A and the threshold S2 of the runway P2. The distances d1 and d2 are easy to calculate using standard georeferencing formulae. Furthermore, the angle a3 can be calculated using the following expression:

$$\cos a3=d1/d2, \text{ cos being the cosine.}$$

Furthermore, the following applies:

$$a4=90-a3.$$

d4 is considered to be the distance between the point PA, one of the extreme points of the detection area (the other being the point PB), and the threshold S2 of the runway P2. The distance d4 is an initial design datum of the system and this distance can, for example, be equal to 3 nautical miles.

Furthermore, aloc is the angle between the center line L2 of the runway P2 and the horizontal projection of the edges of the scan area ZB. The angle aloc is an initial design datum of the system and this angle can, for example, be equal to 3 degrees.

By using the law of cosines, the following is obtained:

$$RA^2=d4^2+d2^2-2.d2.d4.\cos a5$$

Since a5=180−a4−aloc

The following applies:

$$\begin{cases} \cos a5 = \cos(180-(a4+aloc)) \\ \cos a5 = -\cos a5 \end{cases}$$

Consequently, the following relation is obtained:

RA=(d4$^2$+d2$^2$+2.d2.d4.cos a5)$^{1/2}$, which makes it possible to calculate the distance RA.

Furthermore, the law of sines makes it possible to write:

sin a6=sin a5.(d4/RA).

It is therefore possible to calculate the angle a6 and thus one of the extreme relative bearings (a2+a3+a6) of the area Z1 to be scanned.

Similarly, for the point PB it holds that:

$$\begin{cases} a9 = a5 + aloc + aloc \\ RB = (d4^2 + d2^2 - 2.d2.d4.\cos a9)^{\frac{1}{2}} \\ \sin a8 = \sin a9 \cdot \left(\frac{d4}{RB}\right) \end{cases}$$

This makes it possible to calculate the angle a8 and therefore the second extreme relative bearing (a2+a3+a8) of the area Z1 to be scanned, a9 being the angle formed by the segments S2PB and S2A.

The relative bearings and the horizontal distances RA and RB are thus calculated.

The calculation of the elevations and of the slant ranges RS and RT will now be explained.

To this end, it is assumed that the angle i1 represented in FIG. 6 is an initial design datum of the system. This angular value is recommended to be less than the minimum value of the descent glide slope. It can, for example, be equal to 1.5 degrees.

It is thus possible to calculate the elevation h1 using the expression:

$\tan i1=h1/d4$, tan being the tangent.

Furthermore, the angle e1 that represents the bottom elevation of the area Z1 to be scanned, as represented in FIG. 6, can be calculated using the following expression:

$$\tan e1=h1/RA$$

Similarly, it is possible to calculate the height h2 from the following expression:

$$\tan i2=(h1+h2)/d4$$

in which i2 is an initial design datum of the system. This angular value is recommended to be greater than the maximum value of the glide-type descent glide path. It can, for example, be equal to 5 degrees.

Furthermore, the angle e2, which represents the top elevation of the area Z1 to be scanned, can be calculated using the following expression:

$$\tan e2=(h1+h2)/RA$$

Furthermore, the maximum oblique distance RS can be calculated using the following expression:

$$RS=(h1^2+RA^2)^{1/2}$$

Similar calculations can be used to determine the maximum slant range RT to the point PB.

By implementing the above calculations, said means 5 are therefore in a position to determine the following parameters that can be used to define the scan area ZB and therefore to determine said scan commands for the radar 2:

the minimum relative bearing: a2+a3+a6;

the maximum relative bearing: a2+a3+a8;

the maximum horizontal detection distance: RA and RB;

the maximum detection slant range: RS and RT;

the minimum elevation: h1; and the maximum elevation: h1+h2

The invention claimed is:

1. A method of detecting nearby aircraft situated on or close to an airport, comprising:

A/ activating a detection mode that is implemented by at least one radar which is on board an aircraft, which performs a scan of surrounding space, and which can detect, in said detection mode, a nearby moving aircraft;

B/ automatically performing the following operations upon activation of the detection mode:

a) determining a scan area which depends on a runway of the airport;

b) determining scan commands for the radar to have said radar scan said scan area, determining a heading of the aircraft, positions of thresholds of the runway, and an orientation of the runway, determining a maximum relative bearing, a minimum relative bearing, a maximum elevation, a minimum elevation and a slant range for scanning said scan area from the heading, thresholds and orientation, predetermined vertical and horizontal angles of an approach center line of the runway and a predetermined length of edges of the area to be scanned, and determining the scan commands enabling the radar to scan said scan area using the maximum relative bearing, the minimum relative bearing, the maximum elevation, the minimum elevation and the slant range;

c) transmitting the scan commands to said radar to perform a scan of all of said scan area, in said detection mode; and d) presenting a corresponding indication to a pilot of the aircraft if said radar detects, in the scan, presence of at least one nearby aircraft, wherein:

said radar is an air-air mode radar is configured to detect a nearby aircraft that is in flight; and said scan area comprises at least one vertical area of space that is situated to one side of the runway, and positioning of which is defined relative to a center line of the runway.

2. The method as claimed in claim 1, wherein activation of said detection mode of the radar is performed manually by a pilot of the aircraft.

3. The method as claimed in claim 1, wherein, in step A/, the following operations are performed automatically:

α) receiving characteristics of at least one runway of the airport to determine a characteristic position of the runway;

β) determining a current position of the aircraft;

γ) comparing the current position to said characteristic position; and

δ) activating said detection mode if said comparison indicates that the aircraft is located close to said runway.

4. The method as claimed in claim 1, wherein said scan area comprises two vertical areas of space that are situated on either side of the runway, and the positioning of which are defined relative to a center line of the runway.

5. The method as claimed in claim 1, wherein:

a second radar is used, said second radar being provided with a Doppler processing function which is configured to detect nearby aircraft taxiing on the ground and determining a speed of the nearby aircraft relative to the aircraft implementing said method, and said scan area comprises a horizontal area that encompasses at least the surface of said runway.

6. The method as claimed in claim 1, wherein, in step B/d), an alert is emitted if a nearby aircraft is detected.

7. The method as claimed in claim 1, wherein, in step B/d), if the nearby aircraft is detected, presenting a characteristic symbol which illustrates a current position of the nearby aircraft, together with an auxiliary symbol which indicates the nearby aircraft's current altitude, are presented on an airport map which is displayed on at least one display screen.

8. The method as claimed in claim 1, wherein, in step B/d):

determining a danger level for each detected nearby aircraft; and presenting an indication highlighting the corresponding danger level for each detected nearby aircraft.

9. A device for detecting nearby aircraft, which is on board an aircraft situated on or close to an airport comprising:

at least one radar for performing a scan of space and which is configured to detect, in a detection mode, a nearby moving aircraft;

an activation unit for activating a detection mode that is implemented by said radar;

a scan unit for determining a scan area which depends on a runway of the airport and for determining scan commands for the radar, such that said radar scans said scan area, wherein said scan unit determines a heading of the aircraft, positions of thresholds of the runway, and an orientation of the runway, said scan unit determines a maximum relative bearing, a minimum relative bearing, a maximum elevation, a minimum elevation and a slant range for scanning said scan area from the heading, thresholds and orientation, predetermined vertical and horizontal angles of an approach center line of the runway and a predetermined length of edges of the area to be scanned, and said scan unit determines the scan commands enabling the radar to scan said scan area using the maximum relative bearing, the minimum relative bearing, the maximum elevation, the elevation and the slant rage, said scan commands being transmitted to said radar to perform a scan of said scan area in said detection mode; and an indication unit for presenting, an indication to a pilot of the aircraft, indicating detection by the radar of at least one nearby aircraft, wherein:

said radar is an air-air mode radar which is configured to detect a nearby aircraft that is in flight, and said scan unit determines a scan area which comprises at least one vertical area of space that is situated to one side of the runway, and the positioning of which is defined relative to a center line of the runway.

* * * * *